US 12,047,467 B2

(12) United States Patent
Coviello et al.

(10) Patent No.: US 12,047,467 B2
(45) Date of Patent: Jul. 23, 2024

(54) FLEXIBLE AND EFFICIENT COMMUNICATION IN MICROSERVICES-BASED STREAM ANALYTICS PIPELINE

(71) Applicant: NEC Laboratories America, Inc., Princeton, NJ (US)

(72) Inventors: Giuseppe Coviello, Robbinsville, NJ (US); Kunal Rao, Monroe, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/321,880

(22) Filed: May 23, 2023

(65) Prior Publication Data

US 2023/0403340 A1 Dec. 14, 2023

Related U.S. Application Data

(60) Provisional application No. 63/351,803, filed on Jun. 13, 2022.

(51) Int. Cl.
*H04L 67/55* (2022.01)
*H04L 67/563* (2022.01)

(52) U.S. Cl.
CPC ............ *H04L 67/55* (2022.05); *H04L 67/563* (2022.05)

(58) Field of Classification Search
None
See application file for complete search history.

(56) References Cited

U.S. PATENT DOCUMENTS

| 10,972,503 | B1* | 4/2021 | Mohan | H04L 63/14 |
|---|---|---|---|---|
| 2019/0286373 | A1* | 9/2019 | Karumbunathan | G06F 3/065 |
| 2020/0067818 | A1* | 2/2020 | Jeuk | H04L 65/611 |
| 2020/0073956 | A1* | 3/2020 | Chen | G06F 16/128 |
| 2020/0127980 | A1* | 4/2020 | Smith | G06F 16/90339 |
| 2020/0186443 | A1* | 6/2020 | Fitzer | H04L 41/0806 |
| 2021/0011823 | A1* | 1/2021 | Guim Bernat | G06F 11/263 |

(Continued)

OTHER PUBLICATIONS

Krizhevsky, A., Sutskever, I., & Hinton, G. E. (May 24, 2017). Imagenet classification with deep convolutional neural networks. Communications of the ACM, 60(6), 84-90.

(Continued)

*Primary Examiner* — Ranodhi Serrao
(74) *Attorney, Agent, or Firm* — Joseph Kolodka

(57) ABSTRACT

A pull-based communication method for microservices-based real-time streaming video analytics pipelines is provided. The method includes receiving a plurality of frames from a plurality of cameras, each camera including a camera sidecar, arranging a plurality of detectors in layers such that a first detector layer includes detectors with detector sidecars and detector business logic, and the second detector layer includes detectors with only sidecars, arranging a plurality of extractors in layers such that a first extractor layer includes extractors with extractor sidecars and extractor business logic, and the second extractor layer includes extractors with only sidecars, and enabling a mesh controller, during registration, to selectively assign inputs to one or more of the detector sidecars of the first detector layer and one or more of the extractor sidecars of the first extractor layer to pull data items for processing.

20 Claims, 6 Drawing Sheets

(56) References Cited

U.S. PATENT DOCUMENTS

| | | | |
|---|---|---|---|
| 2021/0014303 A1* | 1/2021 | Guim Bernat | H04L 41/5051 |
| 2021/0021609 A1* | 1/2021 | Smith | H04L 45/72 |
| 2021/0144517 A1* | 5/2021 | Guim Bernat | H04L 41/0869 |
| 2021/0302621 A1* | 9/2021 | Brown | H04Q 9/00 |
| 2022/0121470 A1* | 4/2022 | Saxena | H04L 63/20 |
| 2022/0201320 A1* | 6/2022 | Karunaratne | G06V 20/41 |

OTHER PUBLICATIONS

Coviello, G., Rao, K., Sankaradas, M., & Chakradhar, S. (May 7, 2022). DataX: A system for Data eXchange and transformation of streams. In Intelligent Distributed Computing XIV (pp. 319-329). Cham: Springer International Publishing.

A. Communication, "AXIS Network Cameras," https://www.axis.com/products/network-cameras. (Retrieved on May 11, 2023).

Cisco, "Cisco Video Surveillance IP Cameras," https://www.cisco.com/c/en/us/products/physical-security/videosurveillance-ip-cameras/index.html. (Retrieved on May 11, 2023).

M. N. Patrick Grother and K. Hanaoka, (Sep. 2019) "Face Recognition Vendor Test (FRVT)," https://nvlpubs.nist.gov/nistpubs/ir/2019/NIST.IR.8271.pdf/.

Linkerd, [Online]. Available: https://linkerd.io/2.11/overview/ (Retrieved on May 11, 2023).

Makris, A., Tserpes, K., & Varvarigou, T. (Feb. 23, 2022). Transition from monolithic to microservice-based applications. Challenges from the developer perspective. Open Research Europe, 2, 24.

Aksakalli, I. K., Çelik, T., Can, A. B., & Tekinerdoğan, B. (Oct. 1, 2021). Deployment and communication patterns in microservice architectures: A systematic literature review. Journal of Systems and Software, 180, 111014.

Richter, D., Konrad, M., Utecht, K., & Polze, A. (Jul. 25, 2017). Highly-available applications on unreliable infrastructure: Microservice architectures in practice. In 2017 IEEE International Conference on Software Quality, Reliability and Security Companion (QRS-C) (pp. 130-137). IEEE.

Hong, X. J., Yang, H. S., & Kim, Y. H. (Oct. 17, 2018). Performance analysis of RESTful API and RabbitMQ for microservice web application. In 2018 International Conference on Information and Communication Technology Convergence (ICTC) (pp. 257-259). IEEE.

Alam, M., Rufino, J., Ferreira, J., Ahmed, S. H., Shah, N., & Chen, Y. (Sep. 16, 2018). Orchestration of microservices for iot using docker and edge computing. IEEE Communications Magazine, 56(9), 118-123.

Bhamare, D., Samaka, M., Erbad, A., Jain, R., & Gupta, L. (Nov. 1, 2018). Exploring microservices for enhancing internet QoS. Transactions on Emerging Telecommunications Technologies, 29(11), e3445.

Niu, Y., Liu, F., & Li, Z. (Apr. 16, 2018). Load balancing across microservices. In IEEE INFOCOM 2018—IEEE Conference on Computer Communications (pp. 198-206). IEEE.

Makdharma, "gRPC load balancing," (Jun. 15, 2017) [Online]. Available: https://grpc.io/blog/grpc-load-balancing/.

W. Morgan, "gRPC Load Balancing on Kubernetes without Tears," (Nov. 14, 2018). [Online]. Available: https://linkerd.io/2018/11/14/grpc-load-balancing-on-kuberneteswithout-tears/.

* cited by examiner

FLEXIBLE AND EFFICIENT COMMUNICATION IN MICROSERVICES-BASED STREAM ANALYTICS PIPELINE

RELATED APPLICATION INFORMATION

This application claims priority to Provisional Application No. 63/351,803 filed on Jun. 13, 2022, the contents of which are incorporated herein by reference in their entirety.

BACKGROUND

Technical Field

The present invention relates to microservice-based applications, and, more particularly, to flexible and efficient communication in a microservice-based stream analytics pipeline.

Description of the Related Art

A big challenge in changing a monolithic application into a performant microservices-based application is the design of efficient mechanisms for microservices to communicate with each other. Prior approaches range from custom point-to-point communication among microservices using protocols like gRPC to service meshes like Linkerd to a flexible, many-to-many communication network using broker-based messaging systems like NATS.

SUMMARY

A pull-based communication method for microservices-based real-time streaming video analytics pipelines is presented. The method includes receiving a plurality of frames from a plurality of cameras, each camera corresponding to a respective camera driver, and each camera including a camera sidecar, arranging a plurality of detectors in layers such that a first detector layer includes detectors with detector sidecars and detector business logic, and the second detector layer includes detectors with only sidecars, arranging a plurality of extractors in layers such that a first extractor layer includes extractors with extractor sidecars and extractor business logic, and the second extractor layer includes extractors with only sidecars, and enabling a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

A non-transitory computer-readable storage medium comprising a computer-readable program for microservices-based real-time streaming video analytics pipelines is presented. The computer-readable program when executed on a computer causes the computer to perform the steps of receiving a plurality of frames from a plurality of cameras, each camera corresponding to a respective camera driver, and each camera including a camera sidecar, arranging a plurality of detectors in layers such that a first detector layer includes detectors with detector sidecars and detector business logic, and the second detector layer includes detectors with only sidecars, arranging a plurality of extractors in layers such that a first extractor layer includes extractors with extractor sidecars and extractor business logic, and the second extractor layer includes extractors with only sidecars, and enabling a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

A system for microservices-based real-time streaming video analytics pipelines is presented. The system includes a processor and a memory that stores a computer program, which, when executed by the processor, causes the processor to receive a plurality of frames from a plurality of cameras, each camera corresponding to a respective camera driver, and each camera including a camera sidecar, arrange a plurality of detectors in layers such that a first detector layer includes detectors with detector sidecars and detector business logic, and the second detector layer includes detectors with only sidecars, arrange a plurality of extractors in layers such that a first extractor layer includes extractors with extractor sidecars and extractor business logic, and the second extractor layer includes extractors with only sidecars, and enable a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
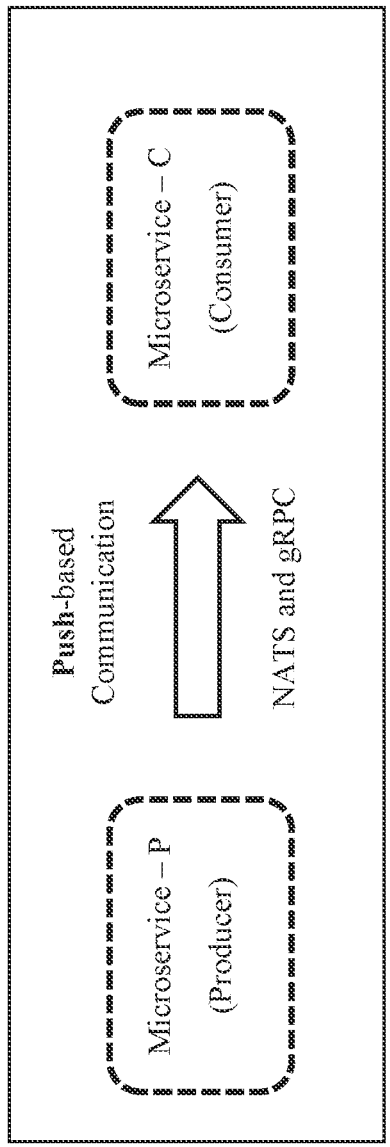
FIG. 1 is a block/flow diagram illustrating the difference between push-based communications and pull-based communications, in accordance with embodiments of the present invention.
Figure 1:
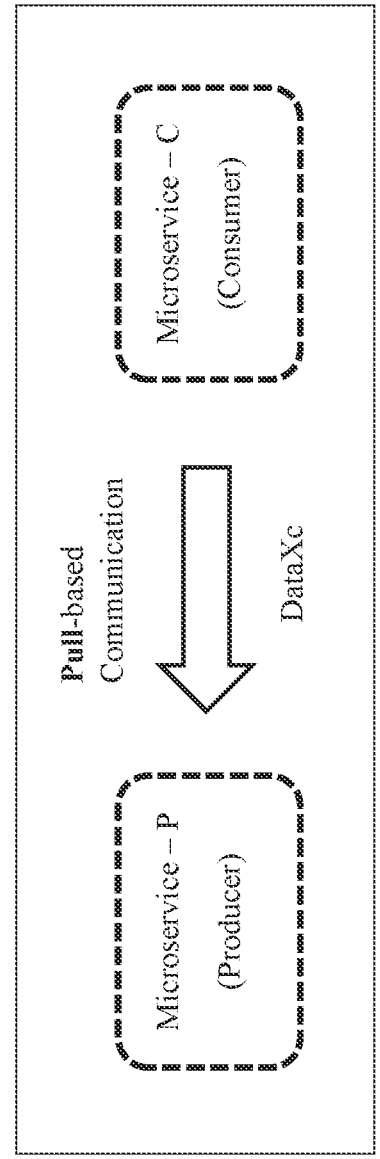

In a monolithic application running in a single process, software components communicate with one another using language-level method or function calls. A big challenge in changing a monolithic application into a performant microservices-based application is the design of efficient mechanisms for microservices to communicate with each other. The exemplary methods focus on microservice-based real-time streaming video analytics pipelines and present a new communication architecture for flexible and efficient communication among the microservices.

Video analytics systems are ubiquitous due to the remarkable progress in computer vision and machine learning techniques, growth of the Internet of Things (IoT), and the more recent advances in edge computing and 5G networks. This significant progress in independent, yet related fields has led to the large-scale deployments of cameras throughout the world to enable new camera-based use-cases in different and diverse market segments including retail, healthcare, transportation, automotive, entertainment, safety and security, etc. The global video analytics market is estimated to grow to $21 billion by 2027.

Real-time video analytics applications are a pipeline of different video analytics tasks. Until recently, such pipelines were realized as monolithic applications. A recent trend is to change the monolithic application into a microservices-based application where each analytics task is a microservice. In one example, the analytics pipeline begins with a frame decoding task, which is followed by pre-processing and video analytics tasks. This is followed by post-processing and analytics output generation to disseminate insights. These tasks, or microservices, rely on an efficient communication architecture to communicate with each other. For communication between microservices, three popular and well-known communication mechanisms are NATS, gRPC, and service meshes like Linkerd.

NATS uses a broker for communication and all data exchange happens through the broker. This makes the system very flexible to add new microservices on-the-fly because the new service only has to interact with the broker. However, since there is a broker in the middle, there is an additional copy of the message that gets created and this leads to a tremendous increase in the network bandwidth utilization.

In gRPC-based communications, there is no broker, rather microservices talk to each other directly. However, due to this direct communication, microservices need to know about each other, which makes the system inflexible because new microservices cannot be added on-the-fly (while the system is in operation). Any new addition of microservices needs to inform other microservices, and changes them to initiate communication with the new microservice. Thus, this is a more rigid system, but it is more efficient in terms of network bandwidth utilization because there is direct communication.

gRPC or Linkerd tend to perform better than NATS on other performance metrics like processing rate, latency, and jitter.

The exemplary methods propose a novel communication architecture DataXc that is as flexible as NATS, but it is also more efficient than NATS, gRPC or Linkerd.

In real-time video analytics applications, several scenarios and challenges arise that techniques like NATS, gRPC or Linkerd do not account for. Video cameras have a configuration parameter called frame rate which can vary anywhere from 1 to 60 frames per second (FPS). Once set, these cameras continue to transmit frames at the specified frame rate for the lifetime of the deployment. Although cameras produce a large number of frames per second, not all of the frames end up being processed through the entire pipeline. For example, consider a face recognition application pipeline, where even though a camera driver can decode and process all the frames produced by the camera, the following microservices in the pipeline, e.g., face detection and feature extraction, cannot keep up since they take about 200 to 250 milliseconds per frame for processing. Thus, processing of all frames by the camera driver is a waste of resources since not all frames get processed in the entire pipeline. NATS, gRPC or Linkerd based communication cannot take advantage of this insight, because they are "push" based communication where they blindly "push" data items to the next microservice in the chain for processing irrespective of whether or not the data item can be processed further. In contrast, the exemplary technique, DataXc, is a "pull" based technique, where the consumers of data items fetch only data items they can process, thereby avoiding wastage of communication resources.

Since not all frames can be processed, another scenario and challenge that arises in real-time video analytics is among the frames that can be processed, which ones to process and which ones to drop. When NATS or gRPC are used, it is seen that the frames are processed non-uniformly, that is, sometimes consecutive 4-5 frames are processed, sometimes there is a drop of 2-3 frames, sometimes 10-12 frames are dropped, or sometimes even 20-23 frames are dropped. This dropping of frames is variable, and, therefore, for a particular camera, depending on the processing rate, it is not guaranteed that every 6th frame or every 10th frame will be processed. Any random frame gets processed, which directly affects the analytics accuracy, as the tracking of objects highly depends on the sequence of processing frames. Such tracking is needed in video analytics applications like people counting. If random frames get processed, then the person tracks get lost and the same person gets counted multiple times, thus losing application accuracy. This non-uniformity in frame processing observed in NATS and gRPC is consciously avoided in DataXc, which focuses on processing evenly spaced frames.

In summary, the contributions are as follows:

A novel communication method is presented, which is referred to as DataXc, which is as flexible as NATS, efficient in terms of network bandwidth utilization and performs better than NATS, gRPC or Linkerd on other metrics like processing rate, latency and jitter. Various challenges that arise in communication between microservices is presented, especially in real-time video analytics applications and show that DataXc's design is well suited (compared to prior proposals like NATS, gRPC or Linkerd) to overcome these challenges. Two real-world video analytics applications are implemented and show that while keeping the same flexibility as NATS, DataXc achieves up to ~80% more processing rate, ~3× lower latency, ~7.5× lower jitter and ~4.5× lower network bandwidth consumption than NATS. Compared to gRPC or Linkerd, DataXc is highly flexible, achieves up to 2× higher (better) processing rate, lower latency and lower jitter, but it also consumes more network bandwidth.

Regarding microservices communication challenges, and with respect to increased wait time for processing data items, with a variable number of consumers and producers, where there is direct access between producers and consumers, it can happen that a single consumer is over-loaded with data items from several producers. In such a scenario the data item from the first producer is processed right away but data items from other producers that arrived slightly later will have to wait until their turn for processing. This is because the consumer can only process data items sequentially in a first come first serve basis. Thus, there will be increased wait time for processing data items from producers when they are not evenly distributed and one of consumers receives more data items than other consumers. Moreover, for real-time applications, where it is important to process most recent data items, it may happen that certain data items will never be processed and get dropped because they were waiting too long and couldn't be processed quickly enough.

Regarding microservice communication challenges, and with respect to non-uniform processing across producers, there are multiple replicas of producer and consumer microservices running at any given point in time. If a one-to-one mapping is kept between a producer and a consumer, then the architecture is quite simple with a direct connection between one producer and one consumer. However, in such an architecture, the architecture is artificially restricting and not exploiting the parallelism that can be achieved by scaling the consumers. In other words, if several consumers are provided, then the data items produced by the producers could be processed in parallel at a much faster rate. However, it is impractical and sometimes impossible to scale the consumers to the extent that every data item produced by the producer can be consumed. So, a situation is provided where a different number of producers and a different number of consumers are used. All these consumers can process data items from any of the producers and emit generated insights, and again go to process the next data item. When multiple replicas of consumers are running in parallel, a situation may arise where some producers' data items are processed more than the others and this variation in the number of data items processed per producer may become quite high.

Regarding microservice communication challenges, and with respect to differential rate of consumption, consumer microservices usually process the data item, generate insights and then emit these insights, thereby producing a data item for the next microservice in the pipeline. They repeat the above steps (e.g., process, emit) over and over for each new data item. Since the processing logic is the same across all replicas of a specific consumer microservice, each of them takes approximately the same time to process a data item (assuming that they are running on comparable hardware). However, when data items from a single producer microservice are being consumed by two different consumer microservices, each with different processing logic, then the rate at which they process data items can significantly differ. This differential rate of processing leads to a differential rate of consumption across the consumer microservices. Not just that, sometimes the content in the frame also determines the processing time, and therefore, even for the same microservice, depending on the video content, the rate of consumption may vary.

As an example, a microservice that connects to the camera is considered that captures and decodes the frames and emits them for further consumption in a video analytics application pipeline. It is assumed that there are two video analytics applications, e.g., face recognition and motion detection, both running on the same camera feed. For the face recognition application, the initial step takes about 200 to 250 milliseconds. On the other hand, the first step for the motion detection application is background subtraction, which takes only about 20 ms. There is a 10× difference in the time it takes to process a particular data item across these two different video analytics applications running on the same camera feed. This difference in processing time leads to a differential rate of consumption.

Depending on how many consumers are consuming from a particular producer and what the rate of consumption by each one of them is, the processing rate at the producer side can be adjusted easily. In other words, if the consumer can only process, say 5 data items per second, then the producer need not produce more than 5 data items, which would be wasted and discarded. Similarly, if there are multiple consumers, then the rate of production is sufficient to match the rate of highest consumption. Anything more is wasted compute cycles at the producer for producing data items, which are never used. DataXc alleviates this challenge.

Regarding NATS, in an implementation using NATS, there is a NATS message queue through which all communication happens. The camera drivers fetch frames from the camera, decode them, and write them ("push") into the queue. There are several detector replicas, which fetch the frames from the queue and write back ("push") the detected faces. Next, the several extractor replicas fetch the detected faces, extract the features for these faces and write them back ("push") into the queue. There is a tag corresponding to the camera and frame, that gets used to identify frames from specific cameras that are being processed. In this implementation, the camera drivers, detector replicas and extractor replicas need not know about each other. All they need to know is the message format that they consume from NATS message queue. This gives the flexibility to add new data streams on the fly, without any need for changing anything in the existing system and also the processing rate, that is, messages processed per second is also very high because data gets written into the message queue continuously and there is always work available to be performed for any microservice. However, there is a drawback in this implementation because there is an additional copy of each message that gets created when communication happens through the message queue. This increases the overall network bandwidth usage of the application.

Regarding gPRC, unlike NATS in gRPC-based communication, each component needs to be aware of the successive component in the pipeline and any change in the number of replicas or a new stream being added, needs a code change in the microservices. In this implementation, detector streams and extractor streams are set up as services and there can be m replicas of detector services and n replicas of extractor services. Camera drivers discover the detector services by querying the domain name system (DNS) service discover and each of these drivers gets a response with the available detector services. It is noted that although the camera drivers receive all the available detectors, they receive the list of these services in a different order. Now, each of these camera drivers obtains the list of detector services and starts "pushing" data to the detector services in a round-robin manner following the same sequence that was received by the DNS query. Thus, all camera drivers start "pushing" data, which is input to the detector services in a round-robin manner, each starting with a different detector service. The same goes for detector services to "push" data to extractor services. In this implementation, although there is no extra copy due to direct communication, the flexibility provided by NATS is lost and the entire application pipeline is very rigid.

Regarding Linkerd with gRPC, NATS provides the flexibility of deployment at the cost of high network bandwidth usage, while gRPC with client-based load balancing, although needs less network bandwidth usage but is very rigid. An alternate implementation using gRPC is to deploy Linkerd and let it handle all gRPC based communication between microservices. In such configuration, there is a "Linkerd Controller" which aids in load balancing and there is an additional "Proxy" added to microservices, which does the actual communication between microservices. These "proxies" are implemented as "sidecars" in a Kubernetes-based cluster deployment. The "proxies" in these detector replicas receive the frame and either process it locally or send it to proxies of other replicas for processing. All proxies are interconnected and based on the load and the associated policy, one of the proxies handles the processing and "pushes" the output to the subsequent microservice in the pipeline.

It is observed that with NATS, there is flexibility but at the cost of too much network bandwidth consumption. In an implementation where gRPC with client-based load balancing is used, network bandwidth consumption is low, but the application pipeline is very rigid, yet flexibility is lost. Linkerd with gRPC relaxes the rigidness and is a bit more flexible but is not as good as NATS in terms of processing rate and fine control. Therefore, any of the existing well-known communication mechanisms don't work well in the scenario of a real-time, microservices-based video analytics application pipeline. To alleviate these problems, the exemplary methods propose a new and novel communication mechanism, which is referred to as DataXc, which uses "pull" based communication (FIG. 1). FIG. 1 illustrates the push-based communication NATS and gPRC 10 and the pull-based coummunicatin in DataXc 100.

To support the "pull" based communication, DataXc provides a software development kit (SDK) with certain application programming interfces (APIs) that need to be used by the microservices. SDK is available for various programming languages including Go, Python, C++ and Java. These APIs are implemented using the idiom of the programming language and are very simple and lightweight. Three main APIs provided by DataXc SDK are:

get-confguration( ) To retrieve the configuration provided at the time of registration of a particular sensor or stream.

next( ): To receive the first available data item from any of the input streams. This function returns the data item and the name of the stream which produced the data item. When there are multiple input streams, the stream's name can be used to identify the source of the input data item.

emit(data item): To publish a data item in the output stream. All data items from a particular driver or AU go in the same output stream. These three APIs are sufficient for DataXc to manage communication between microservices.

Regarding the DataXc architecture 300 (FIG. 3), similar to Linkerd "Proxy," within DataXc 300 there is a sidecar that is attached to the microservice's pod and this sidecar handles all communication within DataXc 300. One major difference in DataXc architecture 300 is that instead of microservices "pushing" data either to a message queue (NATS) or to other microservices (gRPC), they actually "pull" data from other microservices for processing.

Figure 2:
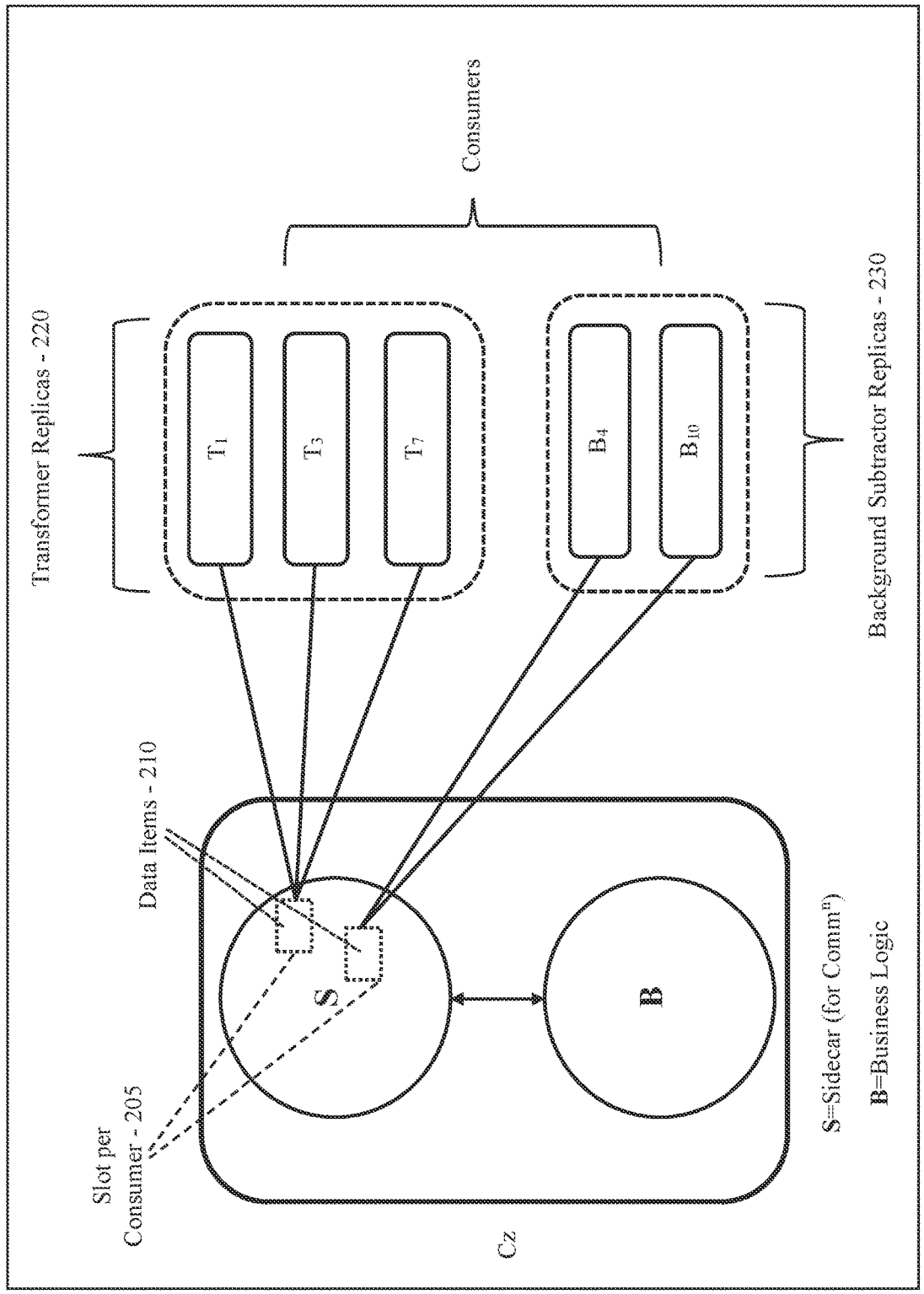
FIG. 2 is a block/flow diagram of exemplary slots in a DataXc sidecar, in accordance with embodiments of the present invention.

For example, in FIG. 2, there is a camera driver $C_Z$ which has frames available as data items 210. There are two microservices replicas, that is, "Transformer" replicas 220 and "Background subtractor" replicas 230 that consume these frames. In this case, the sidecar for the camera driver has two slots 205 and the latest frame is copied in the slot every time. Different replicas of a specific microservice go to the same slot and they "pull" the latest available frame for processing.

Figure 3:
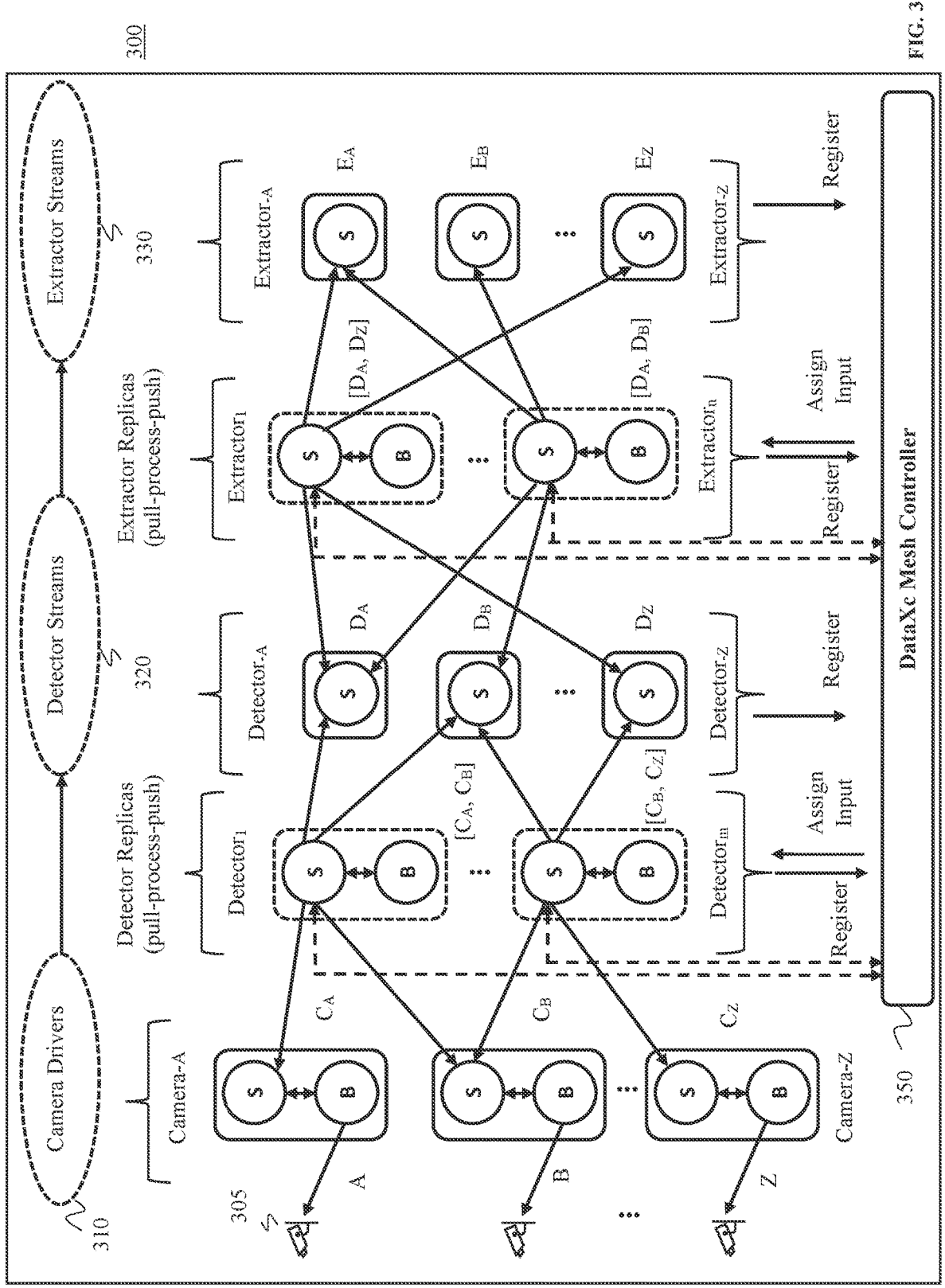
FIG. 3 is a block/flow diagram of an exemplary architecture for the DataXc, in accordance with embodiments of the present invention.

FIG. 3 shows the architecture realized within DataXc 300 for the logical view created by the user. For each of the cameras A through Z (305), there is a corresponding camera driver 310, a detector stream 320, and an extractor stream 330. The detector and extractor streams 320, 330 are "sidecar-only" pods and there are several replicas of the detector ($D_1$ through $D_m$) and extractor ($E_1$ through $E_n$), all of which are packaged as Kubernetes pods along with business logic and a sidecar container within them. The sidecar implements the DataXc APIs (part of the SDK) used by the microservice and is the one that manages all communication between various microservices by communicating with the DataXc Mesh controller 350. Whenever the pod starts, the sidecar container registers with the Mesh controller 350. The stream sidecar provides the name of the stream and the name of the input streams as part of the registration process. For the replicas, during registration, the sidecars provide the name of the replica and the pod name. In response to the registration, the Mesh controller 350 assigns the inputs to the sidecar to which it should connect and "pull" data items.

Each sidecar can get a different set of inputs. For example, sidecar of $D_1$ gets $C_A$ and $C_B$ assigned while sidecar of $D_m$ gets $C_B$ and $C_Z$ assigned. These sidecars then go to the respectively assigned inputs, pull data items, have them processed through the business logic and then push it to the corresponding data stream sidecar ("sidecar-only" pod), which keeps the output ready in the slots for further consumers, e.g., extractors in the pipeline. $E_1$ gets assigned $D_A$ and $D_Z$, while $E_n$ gets assigned $D_A$ and $D_B$. So, detector stream $D_A$ has two slots for $E_1$ and $E_n$, while $D_B$ and $D_Z$ have single slots for $E_n$ and $E_1$, respectively. Output from stream associated with a camera are all appropriately routed to the respective camera's stream through the sidecars. Thus, any new microservice can directly tap into any intermediate stream output and build new applications by reusing output from all existing computations, without the need to rebuild everything from scratch.

The sidecars which get assigned input through the Mesh controller 350, periodically contact the Mesh controller 350 to obtain new assignments, if any. If there is a new assignment, then they start "pulling" data items from the newly assigned inputs, otherwise, they continue to "pull" from the previously assigned inputs. Thus, by design, an application will never go down even if the Mesh controller 350 restarts, e.g., the node on which the Mesh controller 350 is running goes down, Kubernetes will bring it up on another node, but the application will continue to run with a previous input assignment to the sidecars by the Mesh controller 350.

By having a "pull" based design, DataXc 300 enables controlling the production rate at the producer, thereby avoiding unnecessary production of data items that never get consumed. This design choice aids in addressing the challenge above. Also, by having the Mesh controller 350, DataXc 300 can periodically adjust input assignment, which ensures that data items from different producers are processed uniformly and the wait time for processing data items is minimized, thereby addressing the challenges mentioned above.

Another advantage in the architecture and design of DataXc 300 is that the data items never traverse the network if they are not going to be processed, thanks to the "pull" based design. In the instant case, data items are dropped locally at the producer if they are not processed quick enough for real-time applications. On the contrary, for "push" based design, the data item traverses the network to reach the consumers, irrespective of whether it will be processed or not by the consumer. This "pull" based design where data items traverse the network only when needed, saves a lot of wasted network bandwidth.

Along with the above listed advantages, by using DataXc SDK, the actual mechanism for communication between microservices is transparent to the developers. Developers need not worry about and learn different methods of communication and determine which works best for them. Rather, DataXc 300 automatically handles communication behind-the-scenes through sidecars. Moreover, the code written by the developers need not change even if in the future the underlying communication mechanism used by DataXc changes.

In conclusion, the exemplary methods propose a new communication mechanism, DataXc, that is more efficient than prior proposals in terms of message latency, jitter, message processing rate and use of network resources. DataXc is the first communication design that has the desirable flexibility of a broker-based messaging system like NATS and the high-performance of a rigid, custom point-to-point communication method like gRPC. DataXc proposes a novel "pull" based communication method (e.g., consumers fetch messages from producers). This is unlike prior proposals like NATS, gRPC or Linkerd, all of which are "push" based (e.g., producers send messages to consumers). Such communication methods make it difficult to take advantage of differential processing rates of consumers like video analytics tasks. In contrast, DataXc 300 proposes a "pull" based design that avoids unnecessary communication of messages that are eventually discarded by the consumers. Also, unlike prior proposals, DataXc 300 successfully addresses several key challenges in streaming video analytics pipelines like non-uniform processing of frames from multiple cameras, and high variance in latency of frames processed by consumers, all of which adversely affect the quality of insights from streaming video analytics.

Figure 4:
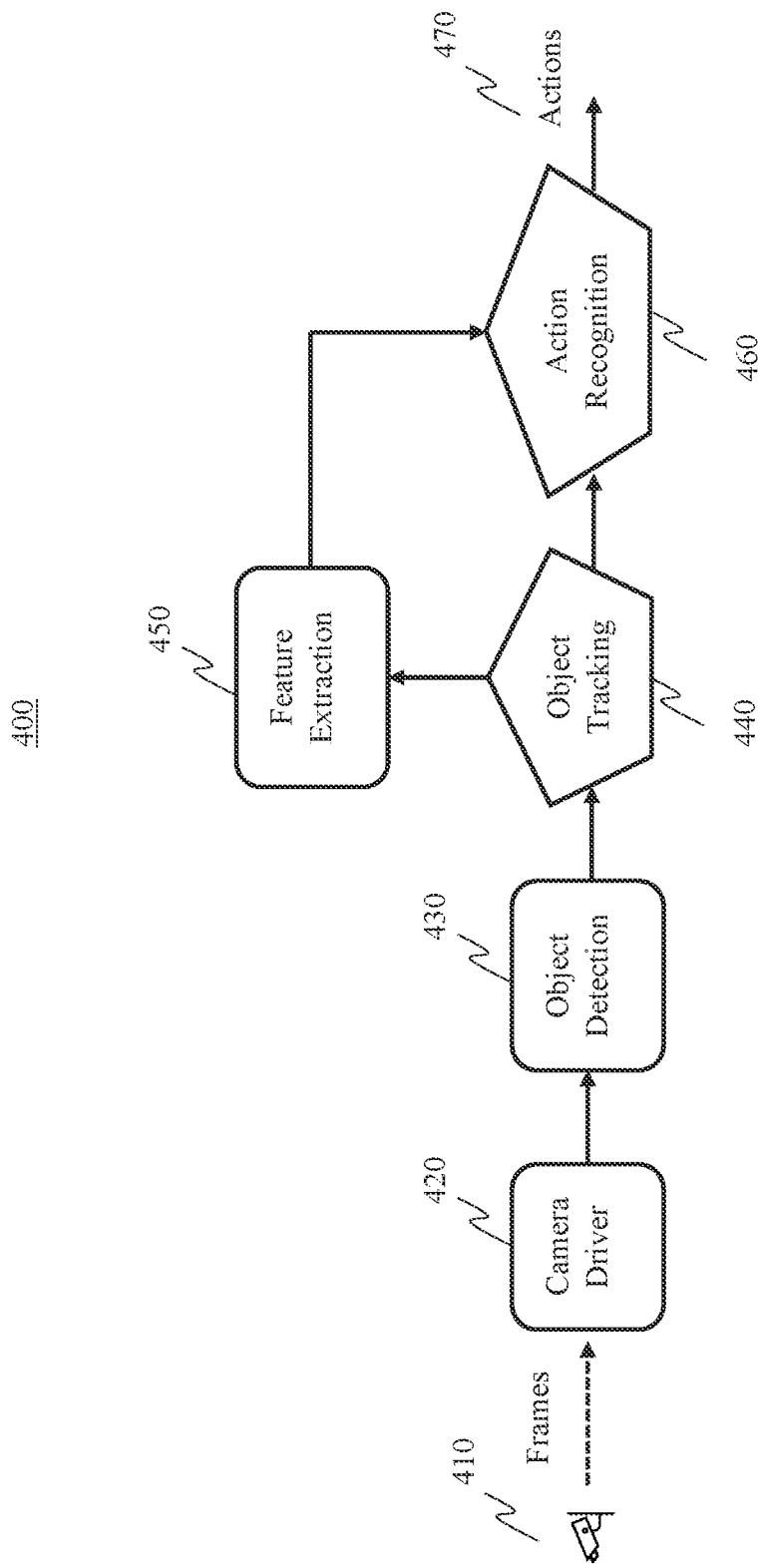
FIG. 4 is a block/flow diagram of an exemplary action recognition pipeline, in accordance with embodiments of the present invention.

FIG. 4 is a block/flow diagram of an exemplary action recognition pipeline, in accordance with embodiments of the present invention.

A real-world action recognition application 400 is shown in FIG. 4. The practical example uses 16 camera drivers 420 corresponding to the 16 cameras 410, 2 replicas of object detection 430, 4 replicas of feature extraction 450 and 16 replicas each (tied to each camera) of object tracking 440 and action recognition 460 to obtain action 470. The object detection 430, feature extraction 450, and the action recognition 460 microservices utilize graphical processing units (GPU) for acceleration. It is observed that DataXc 300 (FIG. 3) achieves the highest processing rate, lowest average latency, lowest jitter, and slightly higher network bandwidth utilization compared to gRPC, but much lower than NATS. For the action recognition application 400, while keeping the same flexibility as NATS, the processing rate is ~80% higher, the average latency is ~2× lower, jitter is ~7.5× lower and network bandwidth consumption is ~4× lower.

Processing rate is defined as the number of messages processed per second. A higher processing rate is usually better for analytics accuracy.

Latency is the time taken to process a single frame through the entire pipeline end-to-end. Lower latency is preferred so that analytics insights can be obtained as quickly as possible.

Jitter defines how close is the system to processing equally spaced frames. Lower the jitter means the system is close to processing equally spaced frames. This directly affects the accuracy of analytics, hence lower the jitter, the better would be the analytics accuracy.

Network bandwidth utilization is the total network bandwidth utilization in the system. Lower network bandwidth is desired so that the system does not unnecessarily consume too much network bandwidth, which may lead to clogging the network and increase network delays.

Figure 5:
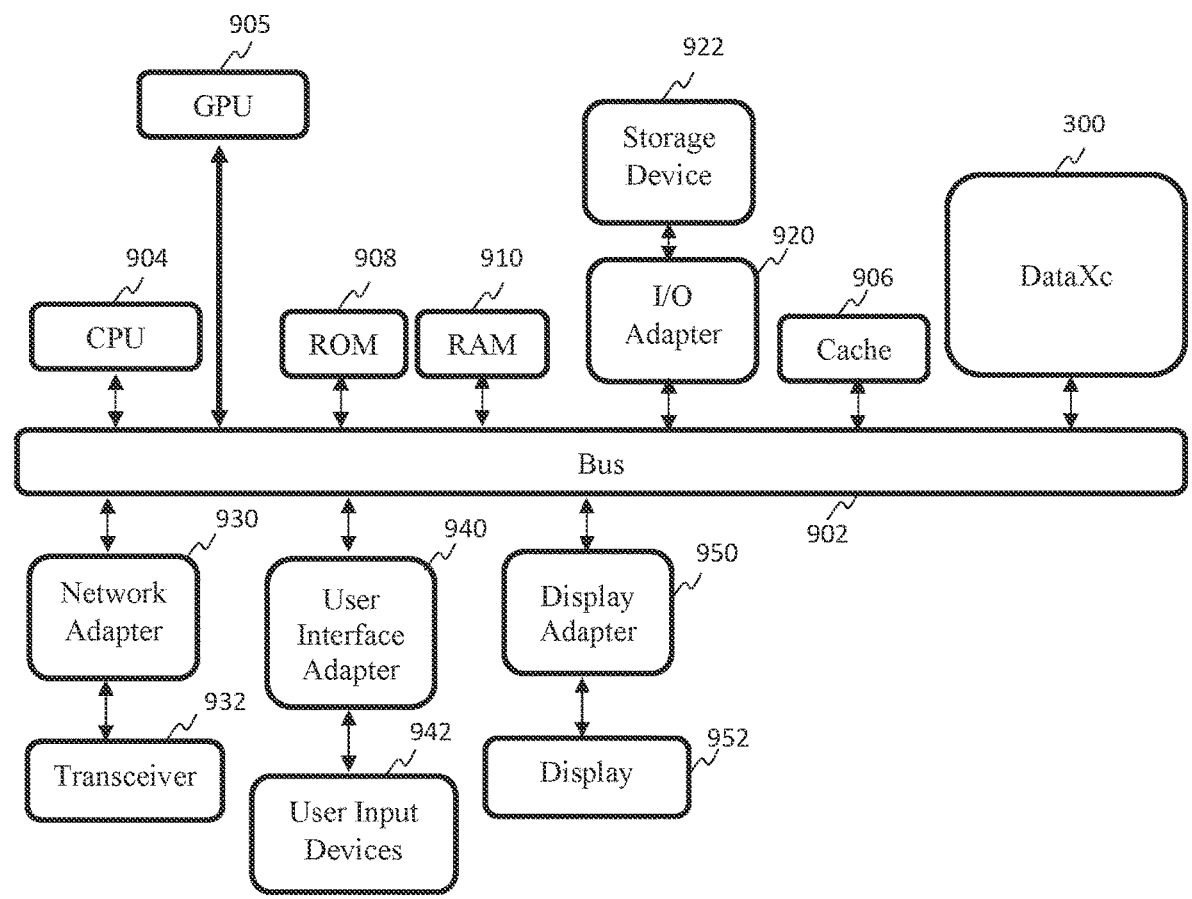
FIG. 5 is a block/flow diagram of an exemplary processing system for microservices-based real-time streaming video analytics pipelines, in accordance with embodiments of the present invention.

FIG. 5 is an exemplary processing system for microservices-based real-time streaming video analytics pipelines, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the DataXc 300 is connected to the bus 902.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
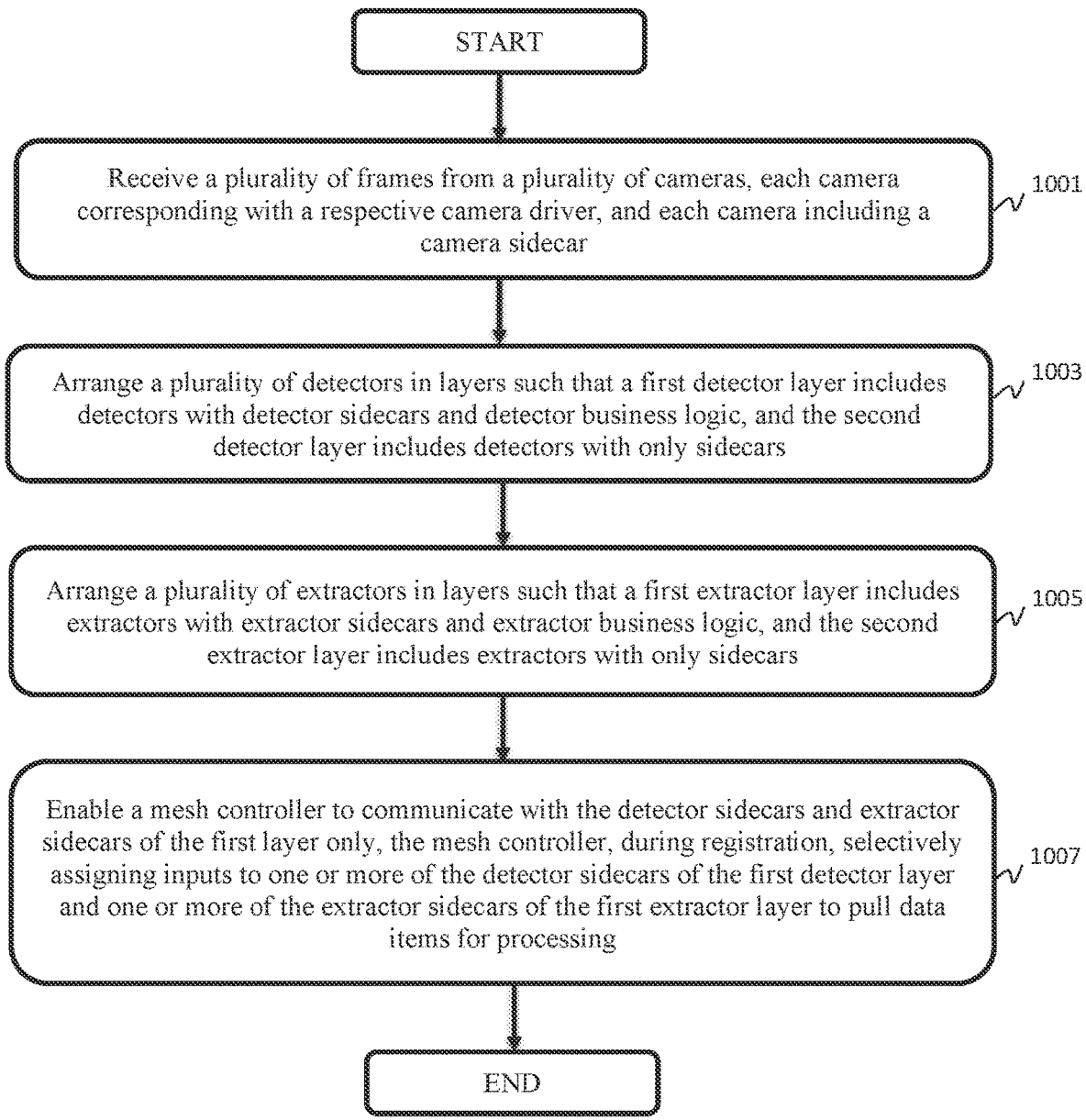
FIG. 6 is a block/flow diagram of an exemplary pull-based communication method for microservices-based real-time streaming video analytics pipelines, in accordance with embodiments of the present invention.

FIG. 6 is a block/flow diagram of an exemplary pull-based communication method for microservices-based real-time streaming video analytics pipelines, in accordance with embodiments of the present invention.

At block 1001, receive a plurality of frames from a plurality of cameras, each camera corresponding to a respective camera driver, and each camera including a camera sidecar.

At block 1003, arrange a plurality of detectors in layers such that a first detector layer includes detectors with detector sidecars and detector business logic, and the second detector layer includes detectors with only sidecars.

At block 1005, arrange a plurality of extractors in layers such that a first extractor layer includes extractors with extractor sidecars and extractor business logic, and the second extractor layer includes extractors with only sidecars.

At block 1007, enable a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

Modern applications are written as a collection of microservices that interact amongst themselves. The performance of inter-microservice communication has a tremendous impact on the overall application performance. The exemplary methods focus specifically on real-time video analytics applications and propose a novel communication technique, which is referred to as DataXc and it is compared to well-known gRPC and NATS based communication methods.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for microservices-based real-time streaming video analytics pipelines, the method comprising:
   receiving a plurality of frames from a plurality of cameras, each camera corresponding to a respective camera driver, and each camera including a camera sidecar;
   arranging a plurality of detectors in layers such that a first detector layer includes detectors with detector sidecars and detector business logic, and the second detector layer includes detectors with only sidecars;
   arranging a plurality of extractors in layers such that a first extractor layer includes extractors with extractor sidecars and extractor business logic, and the second extractor layer includes extractors with only sidecars; and
   enabling a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

2. The computer-implemented method of claim 1, wherein the plurality of detectors and the plurality of extractors are packaged as Kubernetes pods.

3. The computer-implemented method of claim 1, wherein the camera sidecars of the plurality of cameras directly communicate only with the detector sidecars of the first detector layer.

4. The computer-implemented method of claim 1, wherein the sidecars of the second detector layer directly communicate only with the extractor sidecars of the first extractor layer.

5. The computer-implemented method of claim 1, wherein the first detector layer includes detector replicas and the first extractor layer includes extractor replicas, where the detector replicas are prevented from directly communicating with the extractor replicas.

6. The computer-implemented method of claim 1, wherein, during registration, the second detector layer provides a name of a detector stream and a name of an input stream to the mesh controller.

7. The computer-implemented method of claim 1, wherein, during registration, the first detector layer provides a name of a replica and a pod name to the mesh controller.

8. A computer program product for microservices-based real-time streaming video analytics pipelines, the computer program product comprising a non-transitory computer readable storage medium having program instructions embodied therewith, the program instructions executable by a computer to cause the computer to perform a method comprising:
   receiving a plurality of frames from a plurality of cameras, each camera corresponding to a respective camera driver, and each camera including a camera sidecar;
   arranging a plurality of detectors in layers such that a first detector layer includes detectors with detector sidecars and detector business logic, and the second detector layer includes detectors with only sidecars;
   arranging a plurality of extractors in layers such that a first extractor layer includes extractors with extractor sidecars and extractor business logic, and the second extractor layer includes extractors with only sidecars; and
   enabling a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

9. The computer program product of claim 8, wherein the plurality of detectors and the plurality of extractors are packaged as Kubernetes pods.

10. The computer program product of claim 8, wherein the camera sidecars of the plurality of cameras directly communicate only with the detector sidecars of the first detector layer.

11. The computer program product of claim 8, wherein the sidecars of the second detector layer directly communicate only with the extractor sidecars of the first extractor layer.

12. The computer program product of claim 8, wherein the first detector layer includes detector replicas and the first extractor layer includes extractor replicas, where the detector replicas are prevented from directly communicating with the extractor replicas.

13. The computer program product of claim 8, wherein, during registration, the second detector layer provides a name of a detector stream and a name of an input stream to the mesh controller.

14. The computer program product of claim 8, wherein, during registration, the first detector layer provides a name of a replica and a pod name to the mesh controller.

15. A computer processing system for microservices-based real-time streaming video analytics pipelines, comprising:
   a memory device for storing program code; and
   a processor device, operatively coupled to the memory device, for running the program code to:

receive a plurality of frames from a plurality of cameras, each camera corresponding to a respective camera driver, and each camera including a camera sidecar;

arrange a plurality of detectors in layers such that a first detector layer includes detectors with detector sidecars and detector business logic, and the second detector layer includes detectors with only sidecars;

arrange a plurality of extractors in layers such that a first extractor layer includes extractors with extractor sidecars and extractor business logic, and the second extractor layer includes extractors with only sidecars; and enable a mesh controller to communicate with the detector sidecars and extractor sidecars of the first layer only, the mesh controller, during registration, selectively assigning inputs to one or more of the detector sidecars of the first detector layer and one or more of the extractor sidecars of the first extractor layer to pull data items for processing.

16. The computer processing system of claim 15, wherein the plurality of detectors and the plurality of extractors are packaged as Kubernetes pods.

17. The computer processing system of claim 15, wherein the camera sidecars of the plurality of cameras directly communicate only with the detector sidecars of the first detector layer.

18. The computer processing system of claim 15, wherein the sidecars of the second detector layer directly communicate only with the extractor sidecars of the first extractor layer.

19. The computer processing system of claim 15, wherein the first detector layer includes detector replicas and the first extractor layer includes extractor replicas, where the detector replicas are prevented from directly communicating with the extractor replicas.

20. The computer processing system of claim 15,
wherein, during registration, the second detector layer provides a name of a detector stream and a name of an input stream to the mesh controller; and
wherein, during registration, the first detector layer provides a name of a replica and a pod name to the mesh controller.

* * * * *